Patented July 19, 1949

2,476,430

UNITED STATES PATENT OFFICE 2,476,430

DISPERSIONS OF ISOBUTYLENE-DIOLEFIN COPOLYMER

Edward H. Robbins, Brooklyn, N. Y., assignor to The Patent and Licensing Corporation, New York, N. Y., a corporation of Massachusetts No Drawing. Application March 30, 1944, Serial No. 528,743

13 Claims. (Cl. 260—8)

This invention relates to artificial dispersions of synthetic rubber in water and is more particularly concerned with the provision of aqueous dispersions of "Butyl" rubber.

"Butyl" rubber, a commercial form of which is commonly identified by the symbol GR-I, is an isobutylene-conjugated diolefin copolymer containing a small amount of chemical unsaturation. It is this small amount of chemical unsaturation, apparently, that renders it difficult, if not impossible, to economically cure "Butyl" rubber in the presence of certain unsaturated compounds, particularly those of the aliphatic type. For example, the presence in "Butyl" rubber compounds of common rubber softeners, extenders or other usual compounding ingredients having chemical unsaturation, either seriously retards or completely prevents curing of the "Butyl" rubber. In view of these curing limitations, it is not desirable to prepare aqueous dispersions of "Butyl" rubber using the usual forms of soap dispersing agent, such as the saponified rosins or other fatty acids which are generally of an unsaturated character, as it has not been possible under such conditions to obtain aqueous dispersions of "Butyl" rubber from which adequately curable water-free films of the "Butyl" rubber may be deposited.

The present invention has for one of its objects the provision of aqueous dispersions of "Butyl" rubber which are sufficiently stable to permit handling and storage.

Another object is to provide latex-like dispersions of "Butyl" rubber from which readily vulcanizable water-free films of "Butyl" rubber may be obtained.

A further object is to provide "Butyl" rubber in the form of a latex-like dispersion that may be used in place of natural latex. "Butyl" rubber, unlike other synthetic rubbers, such as Buna-S and Perbunan, is not available in the form of a latex at any stage in the process of its manufacture.

An additional object is to provide "Butyl" rubber in aqueous dispersion form for application as an adhesive, as a saturant or coating for paper or cloth, or as a sizing or binding material in paper pulp.

In accordance with the present invention, the foregoing and related objects may be attained by employing a saponified organic acid as the dispersing agent for the "Butyl" rubber, the acid being one that contains substantially no unsaturation in the chain portion of its molecular structure, i. e., contains no more unsaturation than is permissible without having a deleterious effect on the curability of the dispersions of my invention. I have found that a substantially saturated organic acid, such as an hydrogenated rosin, a sulphonated tall oil, or a zinc resinate, when saponified with a small amount of fixed alkali and employed in conjunction with a protein protective colloid, such as casein, will serve adequately to disperse "Butyl" rubber in water.

As a feature of the present invention, I have found that "Butyl" rubber dispersions may be successfully prepared in the manner hereinafter set forth by controlling the dispersion system within a prescribed narrow pH range. By providing in the dispersion system a regulated amount of unsaponified hydrogenerated rosin, sulphonated tall oil, zinc resinate, or any other unsaponified organic acid containing substantially no unsaturation in the chain portion of its molecular structure, for reasons that will be more fully explained hereinafter, the pH will be controlled within the desired limits. Based on the results of experiments conducted, I believe that the unsaponified portion of the organic acid functions as a buffer to maintain the dispersion system within the necessary pH limits. And, as previously indicated, the presence of the organic acid of the above described character will not retard or prevent the vulcanization of the water-free films of "Butyl" rubber that may be obtained from the aqueous dispersion.

The formulae in the following examples are illustrative of preferred embodiments of the invention:

Example I

| | Parts by weight |
|---|---|
| GR-I* | 100 |
| ZnO | 5 |
| Sulfur | 2 |
| Casein | 2-4 |
| KOH | 1-1.5 |
| Hydrogenated rosin (acid #160) | 12 |
| Water (up to 55% total solids content) | |

Example II

| | Parts by weight |
|---|---|
| GR-I* | 100 |
| ZnO | 5 |
| Sulfur | 2 |
| Casein | 2-4 |
| KOH | 1-1.5 |
| Sulphonated tall oil (acid #80) | 24 |
| Water (up to 55% total solids content) | |

Example III

| | Parts by weight |
|---|---|
| GR-I* | 100 |
| ZnO | 5 |
| Sulfur | 2 |
| Casein | 3-4 |
| KOH | 1 |
| Zinc resinate | 15 |
| Water (up to 55% total solids content) | |

*GR-I is a copolymer of isobutylene and isoprene to which approximately 0.25% of a standard rubber antioxidant has been added during manufacture. Of the hydrocarbon present in GR-1, approximately 2% by weight is derived from isoprene.

In the practice of the invention, the zinc oxide, sulfur, powdered hydrogenated rosin (or sulphonated tall oil), and .8 parts of the KOH dissolved in one part of water may be placed in a suitable mixer, such as a Werner-Pfleiderer type, and formed into a paste. Then the "Butyl" rubber, in either a milled or unmilled condition, may be added to the paste and worked in until a homogeneous paste is formed. A 25% casein solution made with the remainder of the KOH may then be added portionwise to the pasty batch, each addition of the casein solution being thoroughly worked into the batch. Alternatively, the casein in a 50% solution may be added at the beginning with .5 parts of the KOH and the other ingredients above specified, the remaining .5 parts of KOH being added in this case, with the diluting water. Then the water is added slowly while the mixture is worked continuously, until a dispersion is formed. Thereafter, additional amounts of water may be added portionwise until the dispersion has been diluted to the desired total solids content, it being preferred to add the rinsings from the casein solution to the diluting water in order to avoid disrupting the homogeneity of the dispersion in the area initially contacted by the added water. The total amount of water used may vary, depending upon the degree of dilution of the dispersion that may be desired.

When proceeding in accordance with the formula of Example III, the zinc resinate, zinc oxide, sulfur, KOH and the casein in a 50% solution may be mixed together in a Werner-Pfleiderer machine to form a paste. Then the "Butyl" rubber may be added to the paste and homogeneously worked together. Water is then added slowly, while working the mixture, until a dispersion is formed, whereupon additional amounts of water may be added to dilute the dispersion to the desired total solids content. The resultant dispersion possesses a high stability characteristic and has a pH of about 9.6. In working with zinc resinate, it was discovered that good dispersions were formed even when the temperatures in the mixer were within the range of 200-300° F., whereas, in working with the hydrogenated rosin, or sulphonated tall oil, care was taken to prevent the temperatures in the mixer from rising much above 140° F.

In order to avoid possible putrefaction of the casein, a small amount of beta-naphthol, say .25 part by weight of the "Butyl" rubber, may be added as a preservative. Where the dispersion product is intended for use as a coating on a fibrous base material, such as textile cloth or paper, a small amount of 1% solution of algin, say .03 part by weight of the rubber, or a similarly small amount of methyl cellulose solution, may be added.

In the formula of Example I, i. e., when using 12 parts of hydrogenated rosin with the 1 part of alkali, approximately 5 parts of the hydrogenated rosin will combine with the alkali to form the soap portion of the combination protein-soap dispersing agent. The remainder, approximately 7 parts, of unsaponified hydrogenated rosin in the dispersion serves to buffer the dispersion to prevent the pH from rising above about 10 to 10.5 or falling below about 9 which, in either event, may prevent making the dispersion, or cause the dispersion to become sandy, grainy or otherwise undesirable.

When sulphonated tall oil is used in place of the hydrogenated rosin, as in Example II, a similar buffering effect takes place with approximately 10 parts of the tall oil combining with the alkali present to form the soap and the remaining 14 parts of unsaponified tall oil serving to buffer the dispersion. It may be noted here that the acid number of sulphonated tall oil is 80, as compared with an acid number of 160 for the hydrogenated rosin, thus explaining, in part, why twice as much sulphonated tall oil (24 parts by weight of the rubber) as hydrogenated rosin (12 parts by weight of the rubber) is required in order to obtain thereby an effect in the production of the dispersion and in the resultant dispersion system which is approximately the equivalent of that obtained with the hydrogenated rosin, as clearly above set forth.

"Butyl" rubber dispersions prepared in accordance with the foregoing formulation, particularly with respect to the employment of an amount of hydrogenated rosin, sulphonated tall oil, zinc resinate or other organic acid containing substantially no unsaturation in the chain portion of its molecular structure, in excess of the amount that is capable of being saponified by the alkali present, remain stable indefinitely under handling and storage conditions.

It is to be noted that while the dispersion may be made satisfactorily only within the above described range, nevertheless, if it is desired to incorporate additional alkali in the dispersion in order to increase the pH for any particular purpose of application, this may be done after the dispersion has been made as above described, without untoward results.

A further understanding of the buffering action of the unsaponified hydrogenated rosin, for example, in controlling the pH of the present dispersion system within the above prescribed limits may be obtained by a study of the following data. A solution was prepared containing 2 parts casein, 1 part KOH, 12 parts hydrogenated rosin and 66 parts water, the latter amount being equivalent to that required to make up a dispersion of "Butyl" rubber containing approximately 55% total solids content. To beaker #1 of this solution was added solutions of KOH in increments of approximately .25 gram. To beaker #2 of this same solution was added solutions of $AlCl_3$ in increments of approximately 0.1 gram. In each case, after the addition of each increment, the pH of the solution was recorded and the physical condition of the solution was noted. AlCl₃ was selected as the acid salt in order to duplicate conditions believed to exist in the actual "Butyl" rubber dispersion, as the "Butyl" rubber compound is known to contain small amounts of certain metal salts, including AlCl₃.

|  | pH | Condition of Solution |
|---|---|---|
| Solution #1 | 9.4 | Cloudy, containing beads of rosin. |
| 0.25 gram KOH added | 9.5 | Do. |
| 0.50 gram KOH added | 9.6 | Do. |
| 0.75 gram KOH added | 9.5 | Cloudy, containing beads of rosin, rosin decreasing. |
| 1.0 gram KOH added | 9.5 | No change. |
| 1.29 grams KOH added | 9.6 | Do. |
| 1.58 grams KOH added | 9.9 | Cloudy, rosin disappearing. |
| 1.87 grams KOH added | 11.2 | Rosin disappeared—soapy solution formed. |
| 2.16 grams KOH added | 12.0 | No change. |

In this instance, it is apparent that the solution was buffered and the pH did not change to any material extent until 1.58 grams of KOH was added. Theoretically, 1.4 grams of additional KOH should have been sufficient to saponify the excess rosin in the system.

|  | pH | Condition of Solution |
|---|---|---|
| Solution #2 | 9.5 | White precipitate formed on addition of AlCl₃—Beads of rosin present. |
| 0.10 gram AlCl₃ added | 9.4 | Increase in amount of white precipitate rosin still present. |
| 0.20 gram AlCl₃ added | 9.4 | Do. |
| 0.30 gram AlCl₃ added | 9.4 | Do. |
| 0.40 gram AlCl₃ added | 9.3 | Do. |
| 0.50 gram AlCl₃ added | 9.4 | Increase in amount of white precipitate rosin disappearing. |
| 0.60 gram AlCl₃ added | 9.1 | Do. |
| 0.70 gram AlCl₃ added | 9.0 | Do. |
| 0.80 gram AlCl₃ added | 9.0 | Do. |
| 0.90 gram AlCl₃ added | 8.4 | Solution milky white. |
| 1.0 gram AlCl₃ added | 8.4 | Do. |
| 1.1 grams AlCl₃ added | 7.3 | Do. |
| 1.2 grams AlCl₃ added | 6.3 | Solution materially thickened. |

In this instance, also, it is apparent that the solution was buffered and the pH did not change materially until 0.80 gram of AlCl₃ had been added and then there was a relatively slow change in pH to the point where 1.0 gram of AlCl₃ had been added. Then each addition of AlCl₃ resulted in a rather large drop in pH. Theoretically, 1.15 grams of AlCl₃ should have been sufficient to combine with all the rosin present in the system.

Because resins generally are known to have a definite softening or tackifying effect on most types of rubber, including "Butyl" rubber, the hydrogenated rosin may be utilized to good advantage in the present invention both as the softener for the rubber in the preparation of the dispersion and also as the softener for the rubber in the films deposited from the dispersion. For this reason, the hydrogenated rosin serves in lieu of the usual rubber softeners, most of which are chemically unsaturated compounds that would tend to inhibit or prevent entirely the curing of the rubber films.

While it is not entirely clear as to the exact function performed by the casein in the present dispersions, the presence of a protein type of protective colloid appears to be of advantage in reducing the amount of saponifiable ingredient in the preparation of satisfactory dispersions in accordance with the foregoing technique. It is possible to prepare "Butyl" rubber dispersions using a minimum of about 10 parts by weight of casein alone as the dispersing agent. However, water-free films deposited from such dispersions exhibit an undesirable stiffness, possess poor water resistance and tend to re-emulsify in the presence of water. By adding soap, such as the saponified hydrogenated rosin acid, the saponified sulphonated tall oil, or the saponified zinc resinate, in the amounts specified in the foregoing formulae, the amount of protein can be reduced to a safe minimum of about two parts by weight and still produce a satisfactory dispersion that will yield water-free films of "Butyl" rubber possessing desirable characteristics. Thus, there is evidenced a definite cooperation between the soap and the protein, whether it be casein or another protein, such as alpha soy-bean protein, in the production of the present dispersions, although the exact nature of this cooperation has not as yet been determined. It may be that the presence of the small amount of soap produces a favorable surface tension condition by which a smaller amount of casein is capable of effecting the dispersion in cooperation with the soap.

Films of the "Butyl" rubber dispersion comprising the present invention may be readily vulcanized by subjecting the dried films to elevated temperatures of approximately 300° F. for about 10 to 20 minutes, the usual rubber vulcanizing accelerators being added to the dispersion just prior to the vulcanizing operation. "Butyl" rubber vulcanizates are unusually resistant to natural or artificial aging, even in the presence of materials which actively catalyze the deterioration of natural rubber, and are highly impermeable to gases.

I claim:

1. A dispersion comprising an isobutylene-conjugated diolefin copolymer containing a small amount of chemical unsaturation dispersed in water, and a dispersing agent comprising water dispersible protein and saponified hydrogenated rosin, said dispersion containing unsaponified hydrogenated rosin.

2. A dispersion comprising an isobutylene-conjugated diolefin copolymer containing a small amount of chemical unsaturation dispersed in water, and a dispersing agent comprising water dispersible protein and saponified sulphonated tall oil, said dispersion containing unsaponified sulphonated tall oil.

3. A dispersion comprising an isobutylene-conjugated diolefin copolymer containing a small amount of chemical unsaturation dispersed in water, and a dispersing agent comprising water dispersible protein and saponified zinc resinate, said dispersion containing unsaponified zinc resinate.

4. A stable dispersion comprising an isobutylene-conjugated diolefin copolymer containing a small amount of chemical unsaturation dispersed in water, and a dispersing agent comprising casein and saponified hydrogenated rosin, said dispersion containing unsaponified hydrogenated rosin serving to buffer the dispersion in a pH range of about 9 to 10.5.

5. A stable dispersion comprising an isobutylene-conjugated diolefin copolymer containing a small amount of chemical unsaturation dispersed in water, and a dispersing agent comprising casein and a saponified sulphonated tall oil, said dispersion containing unsaponified sulphonated tall oil serving to buffer the dispersion in a pH range of about 9 to 10.5.

6. A dispersion comprising 100 parts by weight of an isobutylene-conjugated diolefin copolymer containing a small amount of chemical unsaturation dispersed in water, and a dispersing agent comprising 2 parts by weight of water-dispersible protein and approximately 5 parts by weight of saponified hydrogenated rosin, said dispersion containing approximately 7 parts by weight of unsaponified hydrogenated rosin, and water.

7. A dispersion comprising 100 parts by weight of an isobutylene-conjugated diolefin copolymer containing a small amount of chemical unsaturation dispersed in water, and a dispersing agent comprising 2 parts by weight of water-dispersible protein and approximately 10 parts by weight of saponified sulphonated tall oil, said dispersion containing approximately 14 parts by weight of unsaponified sulphonated tall oil, and water.

8. A process for preparing stable aqueous dispersions of an isobutylene-conjugated diolefin copolymer containing a small amount of chemical unsaturation, said process comprising working a mixture of an isobutylene-conjugated diolefin copolymer containing a small amount of chemical unsaturation, alkali, hydrogenated rosin and a solution of water-dispersible protein into a homogeneous fixed mass, adding water slowly while working the mixture to form a dispersion, regulating the amount of said hydrogenated rosin with respect to the alkali so that the pH of the dispersion system will be maintained between about 9 and 10.5.

9. A process for preparing stable aqueous dispersions of an isobutylene-conjugated diolefin copolymer containing a small amount of chemical unsaturation, said process comprising working a mixture of an isobutylene-conjugated diolefin copolymer containing a small amount of chemical unsaturation, alkali, sulphonated tall oil and a solution of water dispersible protein into a homogeneous mass, adding water slowly while working the mixture to form a dispersion, regulating the amount of said sulphonated tall oil with respect to the alkali so that the pH of the dispersion system will be maintained between about 9 and 10.5.

10. A dispersion comprising an isobutylene-conjugated diolefin copolymer containing a small amount of chemical unsaturation dispersed in water, and a dispersing agent comprising water-dispersible protein and a saponification product of an organic acid composition selected from the group consisting of hydrogenated rosin, sulphonated tall oil and zinc resinate, said dispersion containing a portion of said organic acid composition in unsaponified condition.

11. A dispersion comprising an isobutylene-conjugated diolefin copolymer containing a small amount of chemical unsaturation dispersed in water, and a dispersing agent comprising water-dispersible protein and a saponification product of an organic acid composition selected from the group consisting of hydrogenated rosin, sulphonated tall oil and zinc resinate, said dispersion containing sulfur and a portion of said organic acid composition in unsaponified condition and being adapted to yield water-free films of an isobutylene-conjugated diolefin copolymer containing a small amount of chemical unsaturation vulcanizable when subjected to elevated temperatures.

12. A dispersion comprising 100 parts by weight of an isobutylene-conjugated diolefin copolymer containing a small amount of chemical unsaturation dispersed in water, and a dispersing agent comprising 2 parts by weight of water-dispersible protein and approximately 5 parts by weight of a saponification product of an organic acid composition selected from the group consisting of hydrogenated rosin, sulphonated tall oil and zinc resinate, said dispersion containing approximately 7 parts by weight of said organic acid composition in unsaponified condition, and water.

13. A process for preparing stable aqueous dispersion of an isobutylene-conjugated diolefin copolymer containing a small amount of chemical unsaturation, said process comprising working a mixture of an isobutylene-conjugated diolefin copolymer containing a small amount of chemical unsaturation, fixed alkali, organic acid material selected from the group consisting of hydrogenated rosin, sulphonated tall oil and zinc resinate, and a solution of water-dispersible protein into a homogeneous mass, adding water slowly while working the mixture to form a dispersion, regulating the amount of said organic acid with respect to the alkali so that the pH of the dispersion system will be maintained between about 9 and 10.5.

EDWARD H. ROBBINS.

REFERENCES CITED

The following references are of record in the file of this patent:

UNITED STATES PATENTS

| Number | Name | Date |
|---|---|---|
| 2,097,212 | Healy | Oct. 26, 1937 |
| 2,194,958 | Szegvari | Mar. 26, 1940 |
| 2,265,364 | Fowler | Dec. 9, 1941 |
| 2,295,030 | Dales | Sept. 8, 1942 |
| 2,296,427 | Daniel | Sept. 22, 1942 |
| 2,305,007 | Hopff | Dec. 15, 1942 |
| 2,330,504 | Mack | Sept. 28, 1943 |
| 2,340,358 | Young | Feb. 1, 1944 |
| 2,356,128 | Thomas | Aug. 22, 1944 |
| 2,356,130 | Thomas | Aug. 22, 1944 |
| 2,389,796 | Mack | Nov. 27, 1945 |
| 2,394,616 | Knoth | Feb. 12, 1946 |
| 2,414,740 | Holmes | Jan. 21, 1947 |

FOREIGN PATENTS

| Number | Country | Date |
|---|---|---|
| 112,875 | Australia | Apr. 24, 1941 |

OTHER REFERENCES

Lightbown: The Rubber Age, August 1942, vol. 51, No. 5, pp. 377 to 380.

The Rubber Mnf. Assoc. Inc.: A Summary of Data on Synthetic Rubber, Nov. 25, 1942, p. 11.

Rubber Reserve Co.: Specifications for Government Synthetic Rubber, (Received Oct. 3, 1945) sheet A-3-a.

Certificate of Correction

Patent No. 2,476,430.  July 19, 1949.

EDWARD H. ROBBINS

It is hereby certified that errors appear in the printed specification of the above numbered patent requiring correction as follows:

Column 2, line 21, for "hydrogenerated" read *hydrogenated*; column 7, line 22, claim 8, line 36, claim 9, before the word "alkali" insert *fixed*; line 24, claim 8, strike out "fixed";

and that the said Letters Patent should be read with these corrections therein that the same may conform to the record of the case in the Patent Office.

Signed and sealed this 6th day of December, A. D. 1949.

[SEAL]

THOMAS F. MURPHY,
*Assistant Commissioner of Patents.*